(12) United States Patent
Xue et al.

(10) Patent No.: US 12,323,204 B2
(45) Date of Patent: *Jun. 3, 2025

(54) PEER-TO-PEER BEAMFORMING ALIGNMENT IN NEW RADIO (NR) SIDELINK (SL) MODE 2

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 18/304,665

(22) Filed: Apr. 21, 2023

(65) Prior Publication Data

US 2023/0387973 A1    Nov. 30, 2023

Related U.S. Application Data

(63) Continuation of application No. 17/448,474, filed on Sep. 22, 2021, now Pat. No. 11,664,860.

(51) Int. Cl.
*H04B 7/02*    (2018.01)
*H04B 7/0417*    (2017.01)
*H04B 7/0456*    (2017.01)

(52) U.S. Cl.
CPC ......... *H04B 7/0456* (2013.01); *H04B 7/0417* (2013.01)

(58) Field of Classification Search
CPC ............................ H04B 7/0456; H04B 7/0417
USPC ........ 375/267, 262, 261, 259, 295, 219, 316
See application file for complete search history.

(56) References Cited

U.S. PATENT DOCUMENTS

| | | | |
|---|---|---|---|
| 2020/0107236 A1* | 4/2020 | Tseng | H04W 72/044 |
| 2021/0168574 A1* | 6/2021 | Zhang | H04W 4/40 |
| 2023/0092649 A1 | 3/2023 | Xue et al. | |

\* cited by examiner

*Primary Examiner* — Zewdu A Kassa
(74) *Attorney, Agent, or Firm* — Arun Swain

(57) ABSTRACT

This disclosure provides systems, methods, and devices for wireless communication that support mechanisms for sidelink beamforming alignment over a set of resources based on a deterministic sequence in a wireless communication system. In aspects, an sidelink initiator user equipment (UE) may initiate a beamforming alignment procedure with a responder UE over a the sidelink. The initiator UE may define a set of subchannels specified by a deterministic sequence. The set of subchannels may be subchannels over which the initiator UE may perform reception beam sweeping. The deterministic sequence may be anchored to a direct frame number (DFN) of the sidelink frame without initial sensing, and may be determined via a sequence index, as a function of sidelink UE identification ID(s), or a combination thereof. In this manner, the number of bits for indicating the deterministic sequence to the responder UE may be reasonable, manageable, and/or moderate.

20 Claims, 9 Drawing Sheets

PEER-TO-PEER BEAMFORMING ALIGNMENT IN NEW RADIO (NR) SIDELINK (SL) MODE 2

CROSS-REFERENCE TO RELATED APPLICATION

The present Application for Patent is a continuation of U.S. patent application Ser. No. 17/448,474, filed Sep. 22, 2021, and assigned to the assignee hereof. The disclosure of the prior Application is considered part of and is incorporated by reference in this Patent Application.

TECHNICAL FIELD

Aspects of the present disclosure relate generally to wireless communication systems, and more particularly, to sidelink beamforming alignment based on a deterministic sequence.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes selecting a sequence from a plurality of sequences configured for determining a set of resources, from a plurality of resources, over which to perform beamforming alignment over a sidelink with a responder UE. In aspects, the selected sequence is anchored at a direct frame number (DFN) of a current sidelink frame. The method further includes indicating the selected sequence to the responder UE, and performing beamforming alignment with the responder UE over the set of resources according to the selected sequence.

In an additional aspect of the disclosure, a method of wireless communication performed by a UE includes receiving, from an initiator UE, an indication of a sequence selected by the initiator UE. In aspects, the indicated sequence is selected by the initiator UE from a plurality of sequences configured for determining a set of resources, from a plurality of resources, over which to perform beamforming alignment over a sidelink between the UE and the initiator UE, and the indicated sequence is anchored at a DFN of a current sidelink frame. The method further includes performing beamforming alignment with the initiator UE over the set of resources according to the indicated sequence.

In an additional aspect of the disclosure, a UE includes at least one processor and a memory coupled to the at least one processor. The at least one processor stores processor-readable code that, when executed by the at least one processor, is configured to perform operations including selecting a sequence from a plurality of sequences configured for determining a set of resources, from a plurality of resources, over which to perform beamforming alignment over a sidelink with a responder UE. In aspects, the selected sequence is anchored at a DFN of a current sidelink frame. The operations further include indicating the selected sequence to the responder UE, and performing beamforming alignment with the responder UE over the set of resources according to the selected sequence.

In an additional aspect of the disclosure, a UE includes at least one processor and a memory coupled to the at least one processor. The at least one processor stores processor-readable code that, when executed by the at least one processor, is configured to perform operations including receiving, from an initiator UE, an indication of a sequence selected by the initiator UE. In aspects, the indicated sequence is selected by the initiator UE from a plurality of sequences configured for determining a set of resources, from a plurality of resources, over which to perform beamforming alignment over a sidelink between the UE and the initiator UE, and the indicated sequence is anchored at a DFN of a current sidelink frame. The operations further include performing beamforming alignment with the initiator UE over the set of resources according to the indicated sequence.

In an additional aspect of the disclosure, a non-transitory computer-readable medium stores instructions that, when executed by a processor, cause the processor to perform operations. The operations include selecting a sequence from a plurality of sequences configured for determining a set of resources, from a plurality of resources, over which to perform beamforming alignment over a sidelink with a responder UE. In aspects, the selected sequence is anchored at a DFN of a current sidelink frame. The operations further include indicating the selected sequence to the responder UE, and performing beamforming alignment with the responder UE over the set of resources according to the selected sequence.

In an additional aspect of the disclosure, a non-transitory computer-readable medium stores instructions that, when executed by a processor, cause the processor to perform operations. The operations include receiving, from an initiator UE, an indication of a sequence selected by the initiator UE. In aspects, the indicated sequence is selected by the initiator UE from a plurality of sequences configured for determining a set of resources, from a plurality of resources, over which to perform beamforming alignment over a sidelink between the UE and the initiator UE, and the indicated sequence is anchored at a DFN of a current sidelink frame. The operations further include performing beamforming alignment with the initiator UE over the set of resources according to the indicated sequence.

In an additional aspect of the disclosure, an apparatus includes means for selecting a sequence from a plurality of sequences configured for determining a set of resources, from a plurality of resources, over which to perform beamforming alignment over a sidelink with a responder UE. In aspects, the selected sequence is anchored at a DFN of a current sidelink frame. The apparatus further includes means for indicating the selected sequence to the responder UE, and means for performing beamforming alignment with the responder UE over the set of resources according to the selected sequence.

In an additional aspect of the disclosure, an apparatus includes means for receiving, from an initiator UE, an indication of a sequence selected by the initiator UE. In aspects, the indicated sequence is selected by the initiator UE from a plurality of sequences configured for determining a set of resources, from a plurality of resources, over which to perform beamforming alignment over a sidelink between the UE and the initiator UE, and the indicated sequence is anchored at a DFN of a current sidelink frame. The apparatus further includes means for performing beamforming alignment with the initiator UE over the set of resources according to the indicated sequence.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
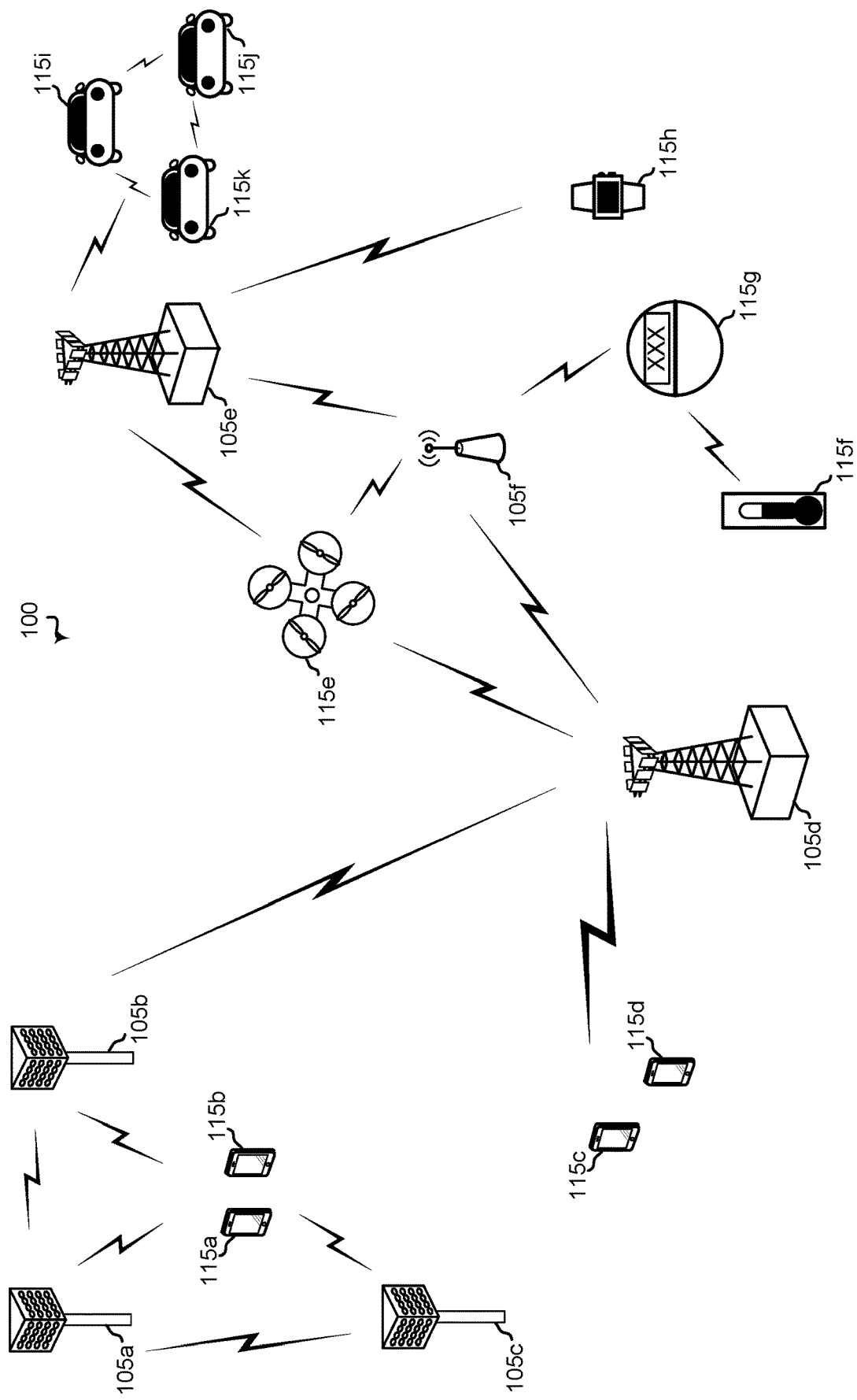
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
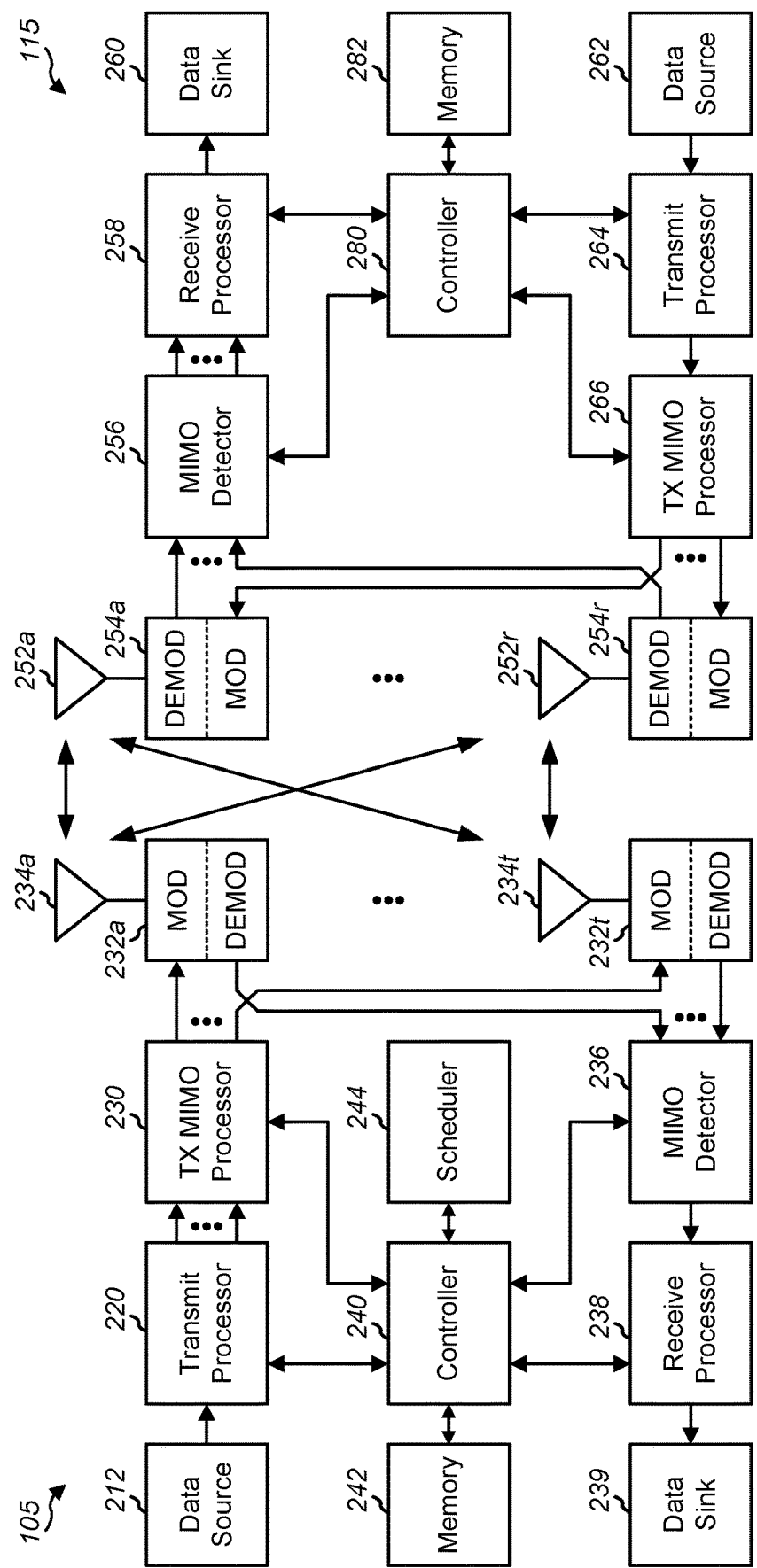
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6 and 7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems implement sidelink communications in which a UE communicates with other UEs directly over a sidelink. Sidelink communications may be particularly useful in Internet of Things (IoT) and/or vehicle-to-everything (V2X) application, in which delivering safety related messages in a sub-6 GHz licensed bands is particularly important.

In some implementations, SL communications between two UEs may operate in one of various modes. In particular, two modes for channel/resource allocation have been specified in current wireless communication system implementations. One such mode, also known as sidelink mode 2, involves a transmitting node autonomously scheduling sidelink transmissions to a receiving UE(s) over the sidelink without the transmitting UE obtaining a transmission grant from a serving base station before it is allowed to transmit to the receiving UE over the sidelink. In another mode, also known as sidelink mode 1, a base station may schedule the sidelink transmissions between the transmitting UE and the receiving UE(s). For example, in sidelink mode 1, a UE may transmit to another UE over the sidelink, but the transmitting UE must obtain a transmission grant (e.g., in a downlink control information (DCI) message) from the serving base station before it is allowed to transmit to the receiving UE over the sidelink. In sidelink mode 1, without a transmission grant, the transmitting UE is not allowed to transmit to the receiving UE over the sidelink. However, once the base station grants the transmission grant to the transmitting UE, the transmitting UE may transmit to the receiving UE over the sidelink.

In implementations, the sidelink transmission may follow a particular scheme. For example, the transmitting UE may transmit control information in a sidelink control information (SCI) message to the receiving UE. The receiving UE may use the control information in the SCI to receive and/or to decode a data transmission (e.g., a co-subchannel physical sidelink shared channel (PSSCH) transmission) from the transmitting UE. In current implementations, each sidelink channel access may include a physical sidelink control channel (PSCCH) transmission carrying the SCI coupled to the PSSCH transmission. The coupled transmission of the PSCCH and PSSCH may be occupy at least one subchannel and may carry one transport block (TB) of data. In these implementations, the SCI may be transmitted in a two-stage procedure, which include stage 1 SCI and stage 2 SCI. In stage 1 SCI, the transmitting UE may transmit information that may indicate resource reservations for other sidelink UEs, as well as information on how to demodulate the co-subchannel PSSCH transmission (e.g., information including modulation and coding scheme (MCS), demodulation reference signal (DMRS) configuration, etc.), and information on how to decode the stage 2 SCI. In stage 2 SCI, which may be transmitted in the PSSCH transmission (e.g., may be piggybacked onto the co-subchannel PSSCH transmission), the transmitting UE may transmit control information on how to decode and process the PSSCH transmission (e.g., information including level 1 (L1) source ID, level 2 (L2) destination ID, sidelink SL process control, etc.), and information that may not be able to be carried in stage 1 SCI. With the SCI control information, the receiving UE may receive and decode the PSSCH transmission and may determine feedback resources for reporting feedback associated with the PSSCH transmission.

In current implementations, beamforming alignment may be used to achieve reasonable data rates over high frequency links. For example, in mmW implementations, beamforming alignment may be used. However, beamforming alignment between a pair of peer sidelink UEs may be a very resource-consuming procedure that may involve a large number of channel accesses. The large resource requirement of beamforming alignment for sidelink implementations may be due to the lack of standalone sidelink reference signals (e.g., channel state information (CSI)-reference signal (RS) and sounding reference signal (SRS) in access links (Uu)) in sidelink implementations. Some solutions have been proposed and/or implemented to alleviate the above mentioned problems, including a configured grant (CG) beamforming alignment process in which to the CG configuration is leveraged to allocate periodic resources for beamforming alignment with relatively moderate signaling overhead.

Generally, beamforming alignment in a sidelink implementation may involve a three-step procedure. In the first step, an initiator UE may perform a sweep of transmission beams, while a responder UE may explore reception beams. In order to avoid blind searching over an unacceptable number of hypotheses, the responder UE may receive an indication of where and/or when (e.g., over which beamforming resources) to perform the reception beam sweeping. In the second step, the responder UE may identify and report the strongest beam pair based on the reception beam sweeping. The strongest beam pair may represent a transmission beam-reception beam pair over which the communication is strongest. In step three, the initiator UE may transmit an acknowledgement (ACK) message to the responder UE to complete the beamforming alignment procedure.

In simplified terms, in a Uu framework, which functions similarly to the above beamforming alignment procedure, beamforming alignment may entail a base station transmitting synchronization signal block (SSB) for the various beams, and a UE may learn how the SSBs are transmitted. For example, the UE may learn where and/or when to perform reception beam sweeping. A remaining minimum system information (RMSI) associated with the SSB may further indicate the arrangement of RACH occasions (ROs) over which the UE may send a beam report to the base station, as well as the arrangement of random-access response (RAR) windows over which the UE may expect to receive a beam-ACK from the base station. This Uu beamforming alignment framework may be applied to a beamforming alignment for an anchor UE in a Mode 2 sidelink cluster. In this case, in addition to serving as a synchronization source, an anchor UE may broadcast system configuration beyond physical sidelink broadcast channel (PSBCH) information, and may have privilege in channel access, such as when transmitting sidelink SSB/PSBCH or even RAR without sensing.

The CG beamforming alignment proposal (also referred to herein as PSSCH-based beamforming alignment proposal) for sidelink UEs operating in mode 1 may include granting periodic resources for beamforming alignment to the initiator UE and indicating the granted periodic resources to the responder UE. The periodically allocated resources may enable low-overhead signaling from the base station towards either the initiator UE or the responder UE, or from the initiator UE to the responder UE. The initiator UE may transmit one or more beam-sweeping SCIs associated with various beams, which may include a request to the responder UE to provide a beam-report SCI. The responder UE may provide the beam-report to the initiator UE including an indication of the strongest beam pair, and the initiator UE may respond by transmitting a beam-ACK SCI to the responder UE. In some implementations, beamforming alignment control information, and/or beam-related reference signals (RSs) may be carried in PSSCH transmissions for beamforming alignment with an anchor UE.

One of the advantages of PSSCH-based beamforming alignment, in comparison with S-SSB based beamforming alignment, may be that PSSCH-based beamforming alignment affords higher flexibility and a relatively wider usage. For example, in Uu, SSB and accompanying SIBs may be "owned" exclusively by the base station. In sidelink implementations, S-SSB and PSBCH may be specified to be transmitted by a sidelink UE, however, the contents of the PSBCH may be significantly simplified (e.g., may not include RMSI), and may be implemented with very strict rules on who can transmit and how to transmit. For example, system frame number (SFN) transmission of sidelink SSB and PSBCH may be utilized to avoid fragmented/isolated sidelink clusters within a same deployment region. Still, one of the main difficulties with applying PSSCH-based beamforming alignment in sidelink mode 2 may be determining how to secure somewhat pre-known and deterministic resources so that the responder UE may be informed, with reasonable signaling overhead, about where and when (e.g., over which resources) to perform reception beam sweeping. In current implementations, a sidelink UE operating in mode 2 may be specified to perform collision avoidance in its sensing procedure. For example, the sidelink UE may be specified to perform random resource selection within a set of available resources in order to avoid persistent collision.

Various aspects of the present disclosure are directed to systems and methods that support sidelink beamforming alignment over a set of resources based on a deterministic sequence in a wireless communication system. In aspects, an initiator UE (e.g., a sidelink UE operating in mode 2 in communication with a responder UE) may initiate a beamforming alignment procedure to perform beamforming alignment with the responder UE over a the sidelink. The initiator UE may define a set of subchannels specified by a deterministic sequence. The set of subchannels may be subchannels over which the initiator UE may perform reception beam sweeping. The deterministic sequence (e.g., a sequence specified as a sequence of resources such as {a, b, c, . . . N}) may be anchored to a direct frame number (DFN) of the sidelink frame (e.g., a DFN indicated in a PSBCH transmission) without initial sensing. In aspects, the deterministic sequence, being deterministic, may be determined via a sequence index, as a function of sidelink UE identification ID(s), or a combination thereof. In this manner, the number of bits for indicating the deterministic sequence to the responder UE may be reasonable, manageable, and/or moderate.

In some aspects, even if no initial sensing may be performed, a $T_3$-ahead re-evaluation may be performed to facilitate coexistence of the with normal mode 2 UEs. The initiator UE may be configured with a relatively high priority (and in some cases the highest priority) for performing the $T_3$-ahead re-evaluation. In aspects, a beam-aware reservation may be provided and/or carried in PSCCH transmissions from the initiator UE in order to facilitate or to ease collision avoidance performed by other UEs (e.g., UEs that are not the initiator UE or responder UE) that may perform enhanced sensing based upon current standards.

Figure 3:
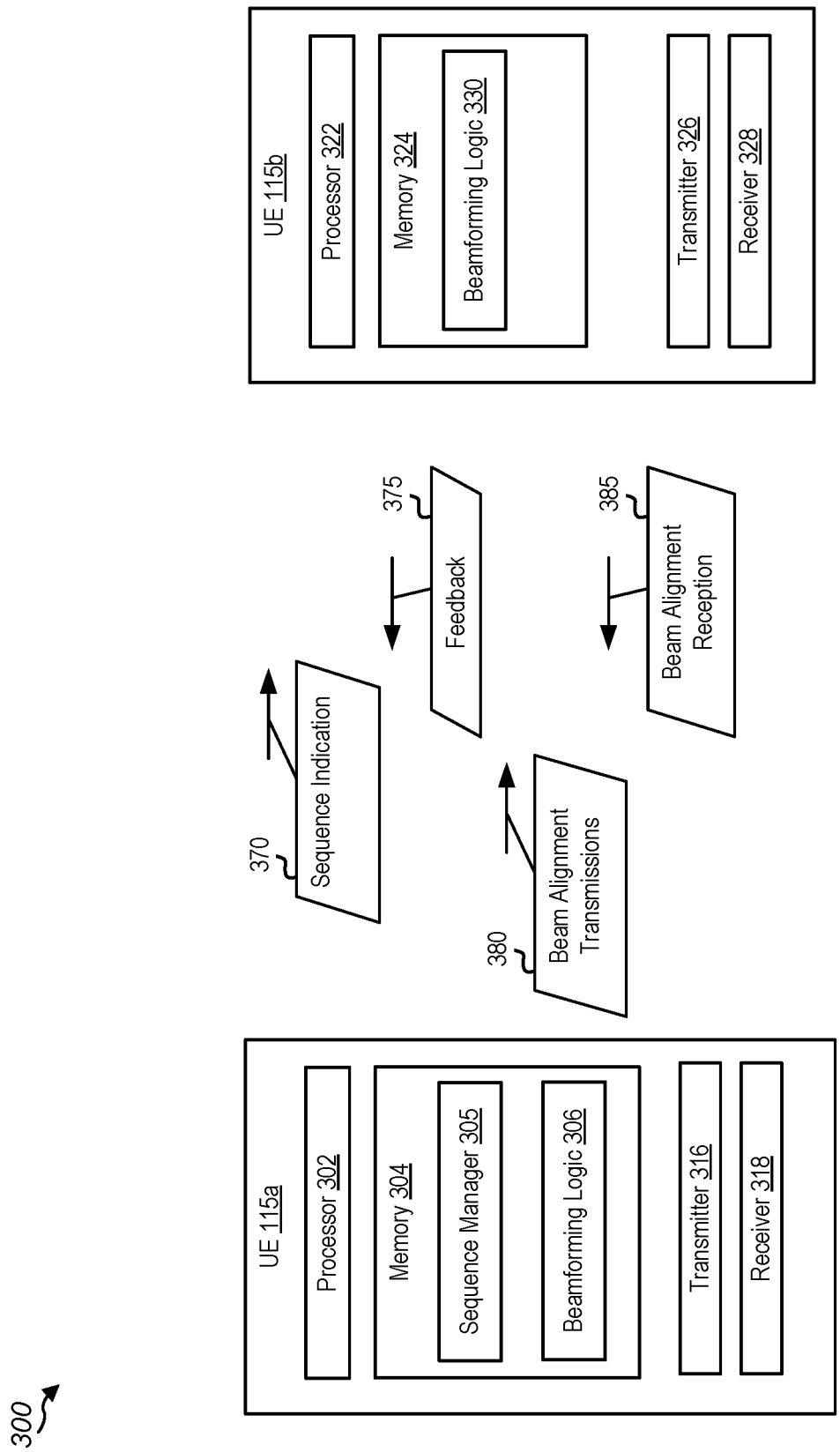
FIG. 3 is a block diagram illustrating an example wireless communication system that supports sidelink beamforming alignment over a set of resources based on a deterministic sequence according to one or more aspects.

FIG. 3 is a block diagram of an example wireless communications system 300 that supports sidelink beamforming alignment over a set of resources based on a deterministic sequence in a wireless communication system according to one or more aspects of the present disclosure. In some examples, wireless communications system 300 may implement aspects of wireless network 100. Wireless communications system 300 includes UE 115a and UE 115b, and may implement a sidelink communication scheme (e.g., sidelink mode 2). In aspects, UE 115a and UE 115b may be in communication over a sidelink. In the discussion that follows, UE 115a may be described as an initiator UE and UE 115b may be described as a responder UE, and in this context UE 115a may initiate a beamforming alignment procedure with UE 115b. However, this description of UE 115a as an initiator UE and UE 115b as a responder UE, as well as the description of system 300 as including two UEs, is merely for illustrative purposes and not intended to be limiting in any way. As such, wireless communications system 300 may generally include additional initiator and/or responder UEs.

UE 115a may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store sequence manager 305 and beamforming logic 306. In aspects, sequence manager 305 may be configured to perform operations for determining and/or selecting a sequence for determining a set of resources (e.g., subchannels) for performing beamforming alignment with responder UE 115b in accordance with aspects of the present disclosure. Beamforming logic 306 may be configured to perform beamforming operations with responder UE 115b in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

UE 115b also may include a variety of components (such as structural, hardware components) used for carrying out one or more functions described herein. For example, these components may include one or more processors 322 (hereinafter referred to collectively as "processor 322"), one or more memory devices 324 (hereinafter referred to collectively as "memory 324"), one or more transmitters 326 (hereinafter referred to collectively as "transmitter 326"), and one or more receivers 328 (hereinafter referred to collectively as "receiver 328"). Processor 322 may be configured to execute instructions stored in memory 324 to perform the operations described herein. In some implementations, processor 322 includes or corresponds to one or more of receive processor 258, transmit processor 264, and controller 280, and memory 324 includes or corresponds to memory 282.

Memory 324 includes or is configured to beamforming logic 330. In aspects, Beamforming logic 306 may be configured to perform beamforming operations with responder UE 115b in accordance with aspects of the present disclosure.

Transmitter 326 is configured to transmit reference signals, control information and data to one or more other devices, and receiver 328 is configured to receive references signals, synchronization signals, control information and data from one or more other devices. For example, transmitter 326 may transmit signaling, control information and data to, and receiver 328 may receive signaling, control information and data from, base station 105. In some implementations, transmitter 326 and receiver 328 may be integrated in one or more transceivers. Additionally or alternatively, transmitter 326 or receiver 328 may include or correspond to one or more components of UE 115 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, initiator UE 115a may determine to perform beamforming alignment with responder UE 115b. For example, in some aspects, initiator UE 115a may determine to establish a beamformed sidelink with responder UE 115b. In some aspects, initiator UE 115a and responder UE 115b may already have a beamformed sidelink established, but a beam failure of the beamformed sidelink may be detected or reported to initiator UE 115a, in which case initiator UE 115a may determine to perform beamforming recovery, which may include a beamforming alignment in accordance with aspects of the present disclosure.

Figure 4:
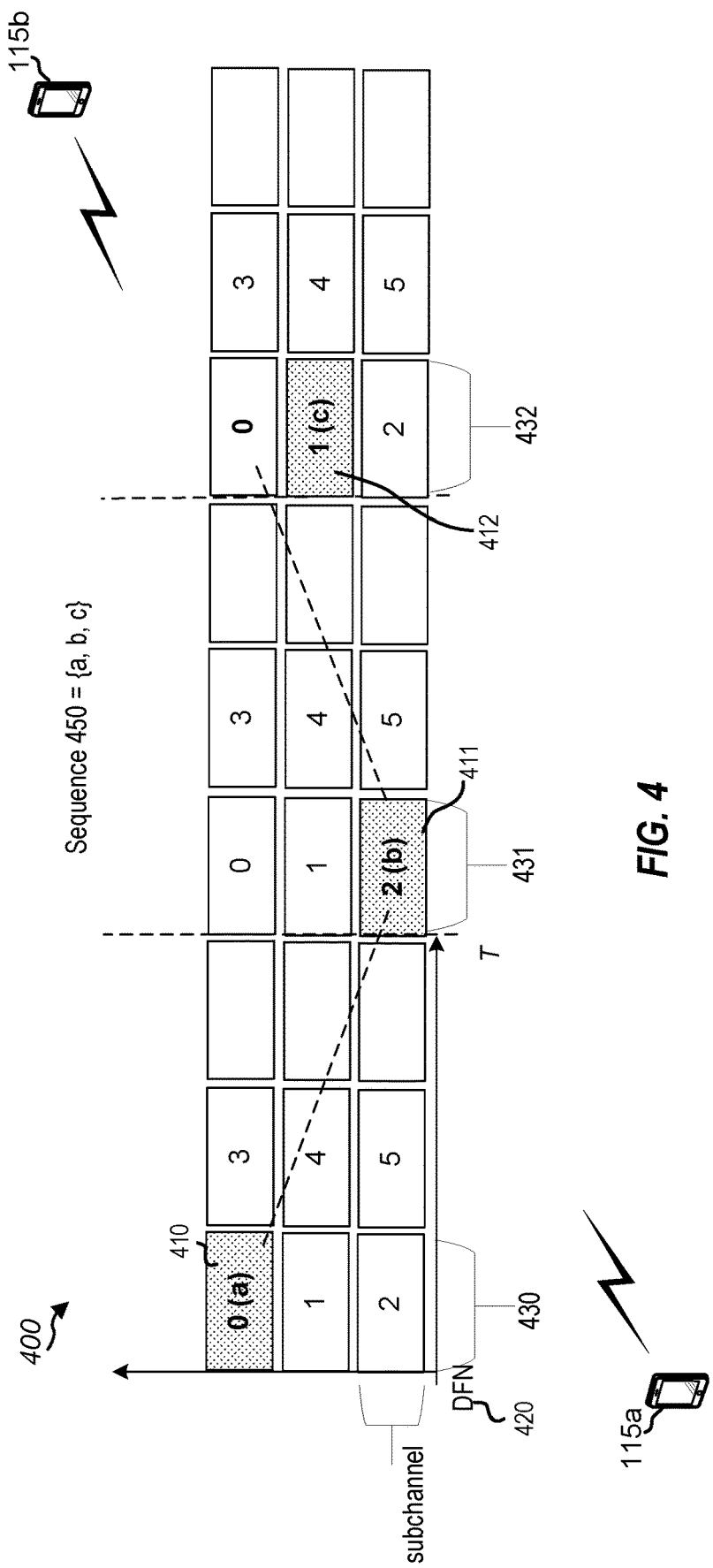
FIG. 4 is a block diagram illustrating an example of a sequence for determining a set of resources for beamforming alignment in accordance with aspects of the present disclosure.

In aspects, a plurality of resources (e.g., slots and/or subchannels) may be configured for the sidelink between initiator UE 115a and responder UE 115b. For example, as illustrated in FIG. 4, a plurality of resources 400 (e.g., a resource pool) may be configured for sidelink communication between initiator UE 115a and responder UE 115b. Typically, in order to establish a beamformed sidelink, initiator UE 115a and responder UE 115b may perform beam sweeping over all of the resources in the resource pool (e.g., plurality of resources 400). In particular, responder UE 115b may perform and exhaustive reception beam sweeping within the entire of the plurality of resources 400 configured for the sidelink. However, in accordance with aspects of the present disclosure, initiator UE 115a may determine and/or select a sequence (e.g., a deterministic sequence) that may be used to determine a set of resources for performing the beamforming alignment between initiator UE 115a and responder UE 115b. In this manner, instead of performing beam sweeping over all the resources of the resource pool, initiator UE 115a and responder UE 115b may perform over the beam sweeping over the set of resources in accordance with the selected sequence.

FIG. 4 is a block diagram illustrating an example of a sequence for determining a set of resources for beamforming alignment in accordance with aspects of the present disclosure. As shown in FIG. 4, a sequence 450 may be determined and/or selected by initiator UE 115a for determining a set of resources for performing beamforming alignment with responder UE 115b. The sequence may define a sequence of resources that may be used for performing beamforming alignment. For example, in the example illustrated in FIG. 4, sequence 450 may include a sequence {a, b, c} corresponding to resources a-c, specifying that beamforming alignment may be performed between initiator UE 115a and responder UE 115b over the set of resources { a, b, c}. In this manner, responder UE 115b may perform beam sweeping over resources a-c, as defined and in the order specified by sequence 450, instead of performing beam sweeping over the entirety of plurality of resources 400. In aspects, sequence 450 may be one of a plurality of deterministic sequences available for determining the set of resources, where each deterministic sequence of the plurality of deterministic sequences may be different.

In aspects, the sequence may be anchored to the DFN of the sidelink frame. For example, sequence 450 may be a sequence that is anchored ad DFN 420. In this manner, sequence 450 may specify a set of resource whose sequence is determined with respect to DFN 420. The sequence may also be defined with an effective periodicity. For example, sequence 450 may have an effective periodicity of T slots, which in the example illustrated in FIG. 4 is T=3 slots. In this manner, sequence 450 may specify a set of resources, where each resource in the set of resources is determined at the periodicity T.

In some aspects, the sequence may be determined or specified based on a hashing function. The hashing function may be configured to take as inputs a slot index, a sidelink UE identification (ID) of the initiator UE, and/or a sidelink UE ID of the responder UE, and to output a resource to be included in the sequence. For example, in generating or determining sequence 450, a hashing function may be invoked every T slots to determine a resource to be included in sequence 450. At slot 430, the hashing function may be invoked to determine, based on the slot index of slot 430, the sidelink UE ID of initiator UE 115a, and/or the sidelink UE ID of responder UE 115b, that resource a (e.g., subchannel 410) is to be included as the first in sequence 450. After T slots, at slot 431, the hashing function may be invoked to determine, based on the slot index of slot 431, the sidelink UE ID of initiator UE 115a, and/or the sidelink UE ID of responder UE 115b, that resource b (e.g., subchannel 411) is to be included as the second in sequence 450. After further T slots, at slot 432, the hashing function may be invoked to determine, based on the slot index of slot 432, the sidelink UE ID of initiator UE 115a, and/or the sidelink UE ID of responder UE 115b, that resource c (e.g., subchannel 412) is to be included as the third in sequence 450. A similar process may continue every T slots to continue building sequence 450 until a total number of resources in the sequence is reached. In aspects, the total number of resources to include in the sequence may be specified based on configuration of initiator UE 115a.

In aspects, the hashing function used to determine the sequence may further include a modulo function (e.g., mod (,U)) that may be used to ensure that the output of the hashing function is uniformly distributed over the resource pool. For example, a baseline parameter U may be defined that specifies the number of resources over which the sequence is to be distributed. For example, as illustrated in FIG. 4, U=6. In this case, at each invocation of the has function (e.g., every T slots), the has function may output a resource in such a way that it is ensured that the resources are distributed over U. For example, at slot 430-432, the sequence is distributed over {a=0, b=2, c=1}. In this manner, T and U may be considered baseline parameters controlling the baseline deterministic sequence. In some aspects, parameters T and U may specified or obtained based on a pre-configuration (e.g., as a default mechanism) of initiator UE 115a, or in some aspects, may be obtained based on a configuration broadcasted along with a sidelink SSB to initiator UE 115a, in which case the default pre-configuration may be overridden with the broadcast configuration.

In aspects, parameters T and U may be loading aware. For example, instead of being directly indicated or configured, parameters T and U may be determined by initiator UE 115a based on a channel busy ratio (CBR) measured over plurality of resources 400 (e.g., the resource pool from where the set of resources defined by sequence 450 is allocated). In aspects, rules for mapping CBR values to loading aware parameters may be provided. As provided, larger CBR values may map to larger T values for a same U value (e.g., there may be a lesser contribution to CBR). Similarly, larger CBR values may lead to smaller U values for a same T value, providing a larger timer interval between two beamforming alignment channel accesses so that another UE (e.g., a neighboring UE) performing full sensing may have enough time to perform collision avoidance. In some aspects, to facilitate collision avoidance for neighboring UEs, beam-sweeping transmissions may carry a reservation field to reserve upcoming PSSCH transmissions, as discussed in more detail below.

In aspects, as noted above, sequence 450 may be one of a plurality of deterministic sequences available for determining the set of resources, where each deterministic sequence of the plurality of deterministic sequences may be different. In aspects, each deterministic sequence of the plurality of deterministic sequences may be associated with a different priority with respect to sidelink channel access. In aspects, the sidelink channel access priority may be provided with respect to preemption of another UE "owning" the resource when the UE may need to access the resource based on the sequence. In aspects, the plurality of deterministic sequences may include at least a set of sequences that may be used with a highest priority in sidelink channel access. Initiator UE 115a may select a sequence according to a priority of the traffic flow or flows that trigger the beamforming alignment with responder UE 115b.

With reference back to FIG. 3, during operation of wireless communications system 300, initiator UE 115a transmits sequence indication 370 to responder UE 115b. Sequence indication 370 may be an indication of the selected sequence. For example, after determining and/or selecting the sequence, initiator UE 115a may send an indicator of the selected sequence to responder UE 115b. In aspects, sequence indication 370 may be a low-bit indication (e.g., an indication including a moderate number of bits, such as less than a byte indication) indicating the selected sequence. Responder UE 115b may use sequence indication 370 to determine the set of resources over which to perform reception beam sweeping as part of the beamforming alignment process. In aspects, sequence indication 370 may also include an indication of the priority associated with the selected sequence. In this manner, sequence indication 370 may serve to as an indication to responder UE 115b of where and when (e.g., which resources) to perform reception beam sweeping, instead of beam sweeping over the entire resource pool (e.g., plurality of resources 400 in FIG. 4).

In some aspects, responder UE 115b may, after receiving sequence indication 370, transmit a feedback message (e.g., an ACK/NACK) to initiator UE 115a informing initiator UE 115a whether sequence indication 370 was received correctly or not. After a success handshaking (e.g., after receiving an ACK from responder UE 115b with respect to sequence indication 370), initiator UE 115a may transmit beam alignment transmissions 380 to responder UE 115b. In aspects, beam alignment transmissions 380 may include beam-sweeping PSSCH transmissions that are transmitted over the resources specified by the sequence. For example, with reference to FIG. 4, initiator UE 115a may transmit beam alignment transmissions 380 over each of subchannels 410, 411, and 412, in accordance with sequence 450. In aspects, beam alignment transmissions 380 may include beam-sweeping SCI messages and/or PSSCH transmissions, such as in CG-based beamforming alignment implementations described above. In some aspects, beam alignment transmissions 380 may carry a sidelink UE ID of initiator UE 115a and/or a sidelink UE ID of responder UE 115b. Responder UE 115b may then perform reception beam sweeping on a valid beam alignment transmission of beam alignment transmissions 380. For example, a valid beam alignment transmission may be a beam alignment transmission over which the sidelink UE IDs of the initiator UE and the responder UE match.

In aspects, during beamforming alignment transmissions (e.g., transmission of beam alignment transmissions 380), at each and any resource specified by the sequence, initiator UE 115a may perform a re-evaluation of the resources in order to provide co-existence with other neighboring UEs (e.g., UEs other than initiator UE 115a and responder UE 115b). Initiator UE 115a may be configured to select a sequence with a relatively high (or in some cases the highest) priority associated to be used during re-evaluation. In aspects, performing re-evaluation of the resource may include performing a $T_3$-ahead re-evaluation (e.g., a re-evaluation based on current standards) before accessing the resource specified by the sequence. Put more precisely, the set of resources (e.g., subchannels) determined based on the selected sequence may be defined by the sequence without initial sensing to determine whether the resources are available. Nonetheless, in accordance with these aspects, accessing of the resources specified by the selected sequence during beamforming alignment transmissions may be based on whether access to the resources is granted by the re-evaluation. Limiting access to the resources during beamforming alignment transmissions based on the re-evaluation may allow for lessening the impact of the beamforming alignment over the set of resources to other UEs (e.g., neighboring UEs) operating in sidelink mode 2. In aspects, the re-evaluation procedure performed on a resource of the set of resources may yield a result indicating whether the resource (e.g., subchannel) is "owned" by another UE. For example, with reference to FIG. 4, prior to transmitting beam alignment transmissions 380 over resource b (e.g., subchannel 411) initiator UE 115a may perform a re-evaluation of subchannel 411 to determine whether subchannel 411 is available or not. Initiator UE 115a may determine that subchannel 411 is available. In this case, initiator UE 115a may access subchannel 411 to transmit beam alignment transmissions 380 to responder UE 115b. However, if initiator UE 115a determines that subchannel 411 is owned by another UE, and thus unavailable, initiator UE 115a may determine the priority of the current owner UE of subchannel 411. If the priority of the current owner UE is lower than the priority of initiator UE 115a with respect to sequence 450, initiator UE 115a may preempt the current owner UE 115 and may access subchannel 411 to transmit beam alignment transmissions 380 to responder UE 115b. On the other hand, if the priority of the current owner UE is equal to or higher than the priority of initiator UE 115a with respect to sequence 450, initiator UE 115a may not preempt the current owner UE 115 and may forego accessing, or may skip, subchannel 411 and may not transmit beam alignment transmissions 380 to responder UE 115b over subchannel 411 in accordance with sequence 450.

Figure 5A:
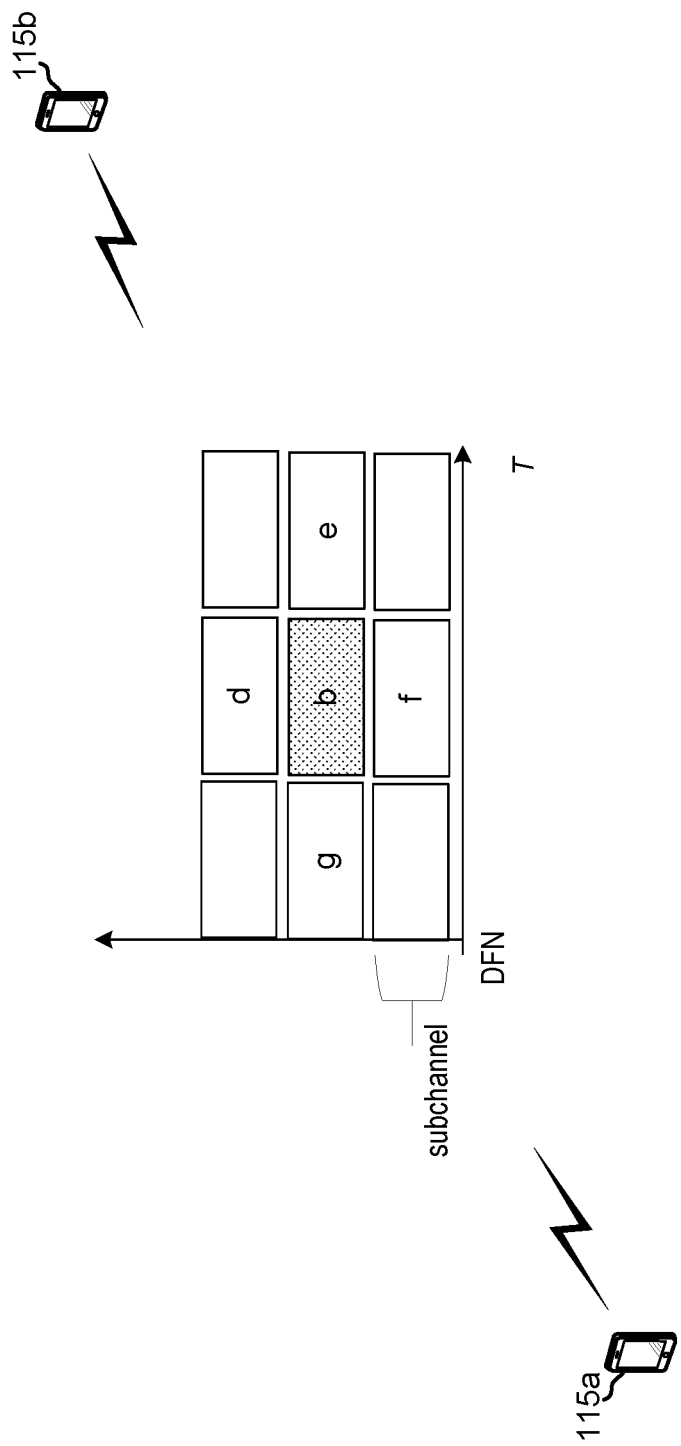
FIG. 5A is a block diagram illustrating an example of a multi-opportunity set for beamforming alignment resources in accordance with aspects of the present disclosure.

In aspects, the selected sequence may specify more than one resource every T slots. For example, instead of specifying a single resource over which beamforming alignment may be performed at every T slots, the selected sequence may specify a multi-opportunity set, effectively specifying an anchor resource and one or more resources anchored to the anchor resource. FIG. 5A is a block diagram illustrating an example of a multi-opportunity set for beamforming alignment resources in accordance with aspects of the present disclosure. In the example illustrated in FIG. 5A, the selected sequence may specify {b} as an anchor resource for performing beamforming alignment. In this example, {d, e, f, g} may be specified as other multiple opportunities. In aspects, the other multiple opportunities may be specified with respect to anchor resource {b}, and may be specified based on a pattern or may be specified as a set of resources. The number of opportunities in the multi-opportunity set may be determined based on responder UE 115b's capability for performing multi-hypotheses reception beam sweeping. For example, responder UE 115b may be determined, based on the multi-hypotheses reception beam sweeping capabilities of responder UE 115b, to support up to four multiple opportunities, in addition to the anchor resource. In this case, {d, e, f, g} may be specified as additional opportunities in the multi-opportunity set.

In aspects, initiator UE 115a may transmit over one available resource within the multi-opportunity set. A resource may be considered available when the resource is neither preempted by another UE (e.g., based on a $T_3$-ahead re-evaluation), nor blocked by a listen-before-talk (LBT) procedure (e.g., an LBT procedure imposed by regulators over the deployed band).

Figure 5B:
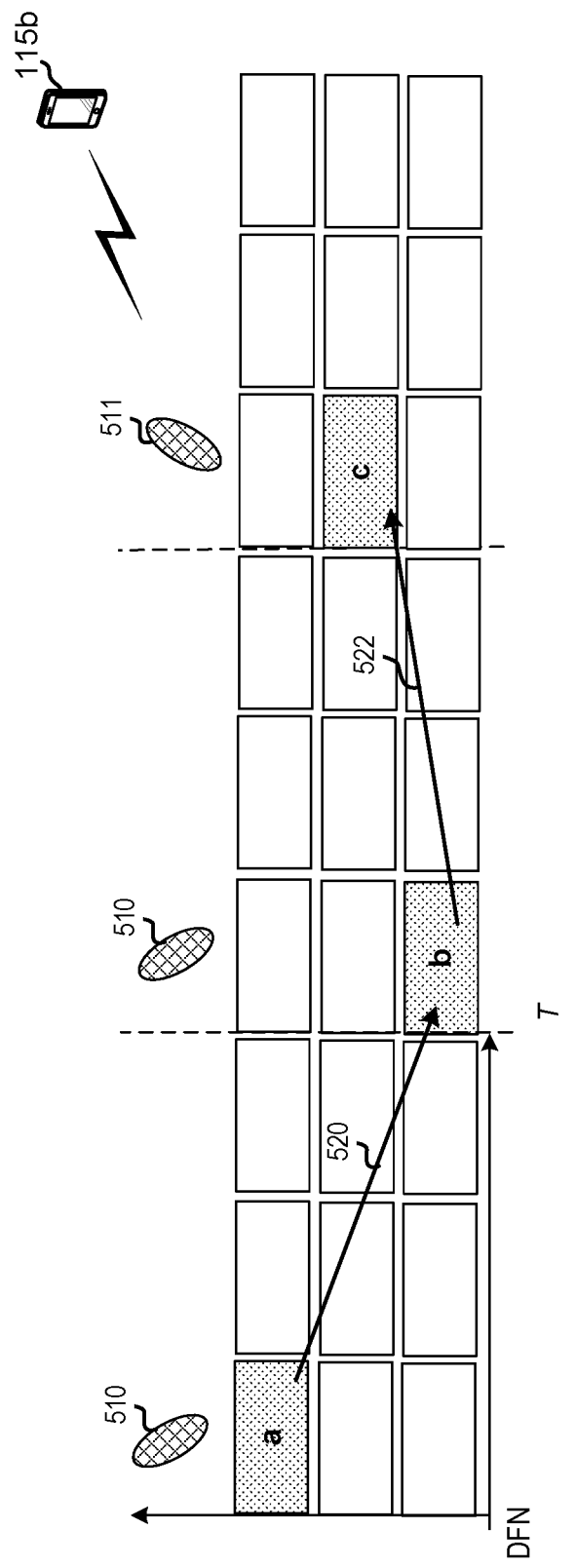
FIG. 5B is a block diagram illustrating an example of a reservation of a beamforming alignment resource in accordance with aspects of the present disclosure.

In aspects, when transmitting beam alignment transmissions 380 over the resources specified by the selected sequence, initiator UE 115a may transmit a reservation in a reservation field within the beam alignment transmissions 380 (e.g., in a reservation field of an SCI message or PSSCH transmission) reserving a next resource as determined by the selected sequence. FIG. 5B is a block diagram illustrating an example of a reservation of a beamforming alignment resource in accordance with aspects of the present disclosure. As shown in FIG. 5B, initiator UE 115a may transmit a beam alignment transmission (e.g., a transmission of beam alignment transmissions 380) to responder UE 115b over resources a (e.g., a resource specified by sequence {a, b, c}). In the beam alignment transmission (e.g., in an SCI message or a PSSCH transmission) initiator UE 115a may include reservation 520, in the reservation field of the beam alignment transmission, reserving resource b, which is the next resource in sequence {a, b, c}. The indication of resource b in the reservation field effectively reserves resource b so that initiator UE 115a may transmit a beam alignment transmission to responder UE 115b over resources b.

In aspects, initiator UE 115a may perform sensing of resource b. The sensing procedure may include measuring a demodulation reference signal (DMRS) reference signal received power (RSRP) during the current transmission (e.g., the transmission over resource a), and using the measure DMRS RSRP to predict whether resource b is available. It is noted that, under this approach, initiator UE 115a may reserve resource b as long as initiator UE 115a is to transmit the beam alignment transmissions using the same beam (e.g., beam 510) over reserved resource b and current resource a.

In aspects, reservation 520 to be transmitted by initiator UE 115a may be configured to be transmitted when the resource to be reserved by reservation 520 is determined to not be occupied by a UE with a higher priority than the priority of initiator UE. In aspects, determining whether the resource to be reserved by reservation 520 is not occupied by a UE with a higher priority than the priority of initiator UE may be determined based on a $T_3$-ahead re-evaluation for the current resource and the future resource to be reserved. For example, a $T_3$-ahead re-evaluation may be performed for resource a and b. During the $T_3$-ahead re-evaluation of resource a, initiator UE 115a may learn that resource b is available (e.g., is not occupied by another UE). In this case, reservation 520 may be sent with the transmissions over a, in order to reserve b. In this manner, the $T_3$-ahead re-evaluation may be performed not only for the coming resource a, but also for the future resource b as determined by the selected sequence in order to facilitate reservation of the future resource.

In aspects, when transmitting beam alignment transmissions 380 to responder UE 115b over the set of resources specified by the selected sequence may entail initiator UE 115a switching from one beam to another. For example, after transmitting beam alignment transmissions 380 over resource b using beam 510, initiator UE 115a may switch to beam 511 to transmit beam alignment transmissions over resource c to responder UE 115b. In these cases, transmitting a reservation of a next resource may include transmitting a cross-beam reservation. For example, during the transmission over resource b, initiator UE 115a may transmit cross-beam reservation 522 to reserve resource c and to indicate to responder UE 115b that initiator UE 115a is to transmit the beam alignment transmissions over resource c using a different beam (e.g., beam 511) than the current beam (e.g., beam 510). In aspects, cross-beam reservation 522 may include a one-bit indication (e.g., included along with the legacy reservation field) indicating a cross-beam reservation. Cross-beam reservation 522 may be received by neighboring UEs and, after decoding the SCI including reservation 522, the neighboring UEs may either honor or ignore reservation 522 from initiator UE 115a without measuring a DMRS RSRP of the current beam alignment transmission from initiator UE 115a over resource b. However, cross-beam reservation 522 may facilitate the sensing UEs (e.g., neighboring UEs) to differentiate between "no reservation" and "reservation but with un-predictable interference" transmissions. In some cases, the cross-beam reservation may be used by initiator UE 115a to indicate that initiator UE 115a is to perform directional reception from responder UE 115b over the reserved resource using the different beam. For example, the initiator may switch beams to collect a beam report from responder UE 115b. In aspects, initiator UE 115a may reset the cross-beam reservation field when a legacy/same-beam reservation in is declared.

In some aspects, the reservation mechanism described herein may be further enhanced to explicitly indicate a beam to be used in the reserved resource. In this case, the beam alignment transmission (e.g., a PSSCH transmission) may be configured to carry a beamformed PSSCH DMRS (e.g., in addition to DMRS for current PSSCH decoding) to be used in the reserved subchannel. For example, cross-beam reservation 522 may be an explicit beam reservation, and initiator UE 115a may transmit, over resource b using beam 510, cross-beam reservation 522 explicitly indicating that beam 511 will be used in the reserved resource c.

In aspects, the beam-aware reservation mechanisms discussed above may be used for data transmissions, rather than only for beamforming alignment transmissions. For example, a transmitting UE may be allowed to switch to a different beam during retransmissions when a current beam has failed. In some aspects, a transmitting UE may be allowed to reserve a new transport block (TB) towards another UE and over a different beam.

As noted above, aspects of the present disclosure for beamforming alignment based on a resource sequence may be applicable in situations when initiator UE 115a and responder UE 115b may already have a beamformed sidelink established, but a beam failure of the beamformed sidelink may be detected or reported to initiator UE 115a. In this case, initiator UE 115a may determine to perform beamforming recovery, which may include a beamforming alignment in accordance with aspects of the present disclosure. In aspects, a pair of beamformed peer sidelink UEs may negotiate a deterministic sequence, as well as who is the initiator UE and who is the responder UE for beamforming recovery if a beam failure is detected.

Figure 6:
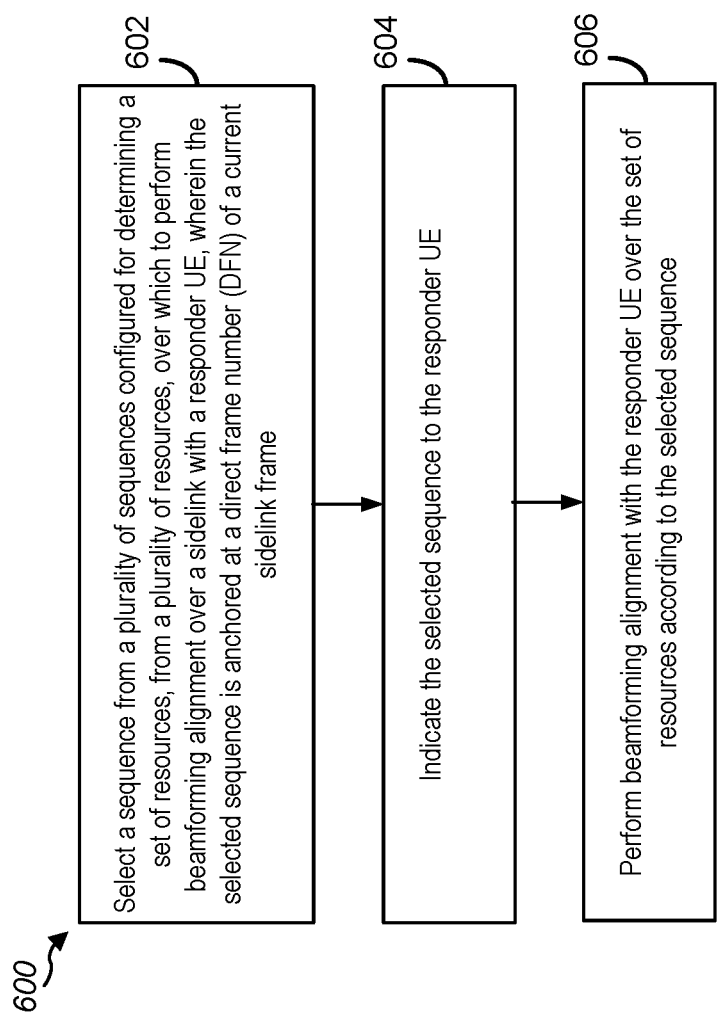
FIG. 6 is a flow diagram illustrating an example process that supports sidelink beamforming alignment over a set of resources based on a deterministic sequence according to one or more aspects.
Figure 8:
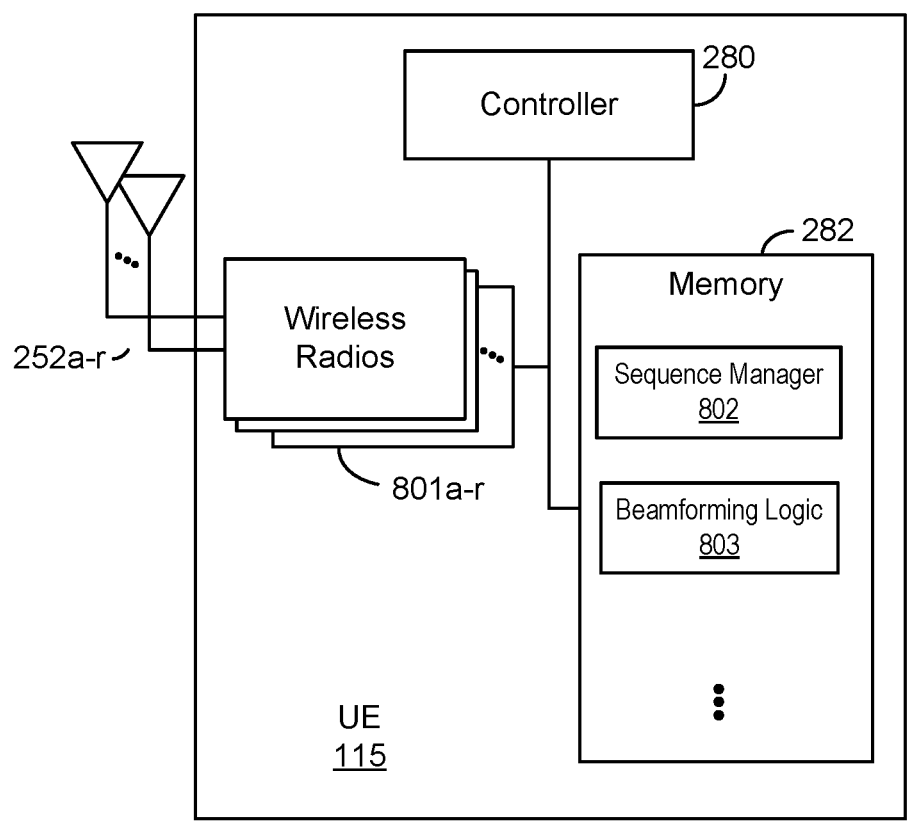
FIG. 8 is a block diagram of an example UE that supports sidelink beamforming alignment over a set of resources based on a deterministic sequence according to one or more aspects.

FIG. 6 is a flow diagram illustrating an example process 600 that provides sidelink beamforming alignment over a set of resources based on a deterministic sequence in a wireless communication system according to one or more aspects. Operations of process 600 may be performed by a UE, such as initiator UE 115*a* described above with reference to FIGS. 1-5 and 8. For example, example operations (also referred to as "blocks") of process 600 may enable UE 115 to support mechanisms for sidelink beamforming alignment over a set of resources based on a deterministic sequence. FIG. 8 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801*a-r* and antennas 252*a-r*. Wireless radios 801*a-r* includes various components and hardware, as illustrated in FIG. 2, including modulator/demodulators 254*a-r*, MIMO detector 256, receive processor 258, transmit processor 264, and TX MIMO processor 266.

At block 602 of process 600, a UE (e.g., UE 115 and/or initiator UE 115*a*) selects a sequence from a plurality of sequences configured for determining a set of resources, from a plurality of resources, over which to perform beamforming alignment over a sidelink with a responder UE. In aspects, the selected sequence is anchored at a DFN of a current sidelink frame. In order to implement the functionality for such operations, UE 115, under control of controller/processor 280, executes sequence manager 802, stored in memory 282. The functionality implemented through the execution environment of sequence manager 802 allows for UE 115 to perform sequence selection operations according to the various aspects herein. In aspects, UE 115 may perform operations to select the sequence form the plurality of sequence according to operations and functionality as described above with reference to initiator UE 115*a* and as illustrated in FIG. 3.

At block 604 of process 600, UE 115 indicates the selected sequence to the responder UE. In order to implement the functionality for such operations, UE 115, under control of controller/processor 280, may transmit an indication of the selected sequence to the responder UE via wireless radios 801*a-r* and antennas 252*a-r*. In aspects, UE 115 may perform operations to indicate the selected sequence to the responder UE according to operations and functionality as described above with reference to initiator UE 115*a* and as illustrated in FIG. 3.

At block 606 of process 600, UE 115 performs beamforming alignment with the responder UE over the set of resources according to the selected sequence. In order to implement the functionality for such operations, UE 115, under control of controller/processor 280, executes beamforming logic 803, stored in memory 282. The functionality implemented through the execution environment of beamforming logic 803 allows for UE 115 to perform beamforming alignment operations according to the various aspects herein. In aspects, UE 115 may perform beamforming alignment operations according to operations and functionality as described above with reference to initiator UE 115*a* and as illustrated in FIG. 3.

Figure 7:
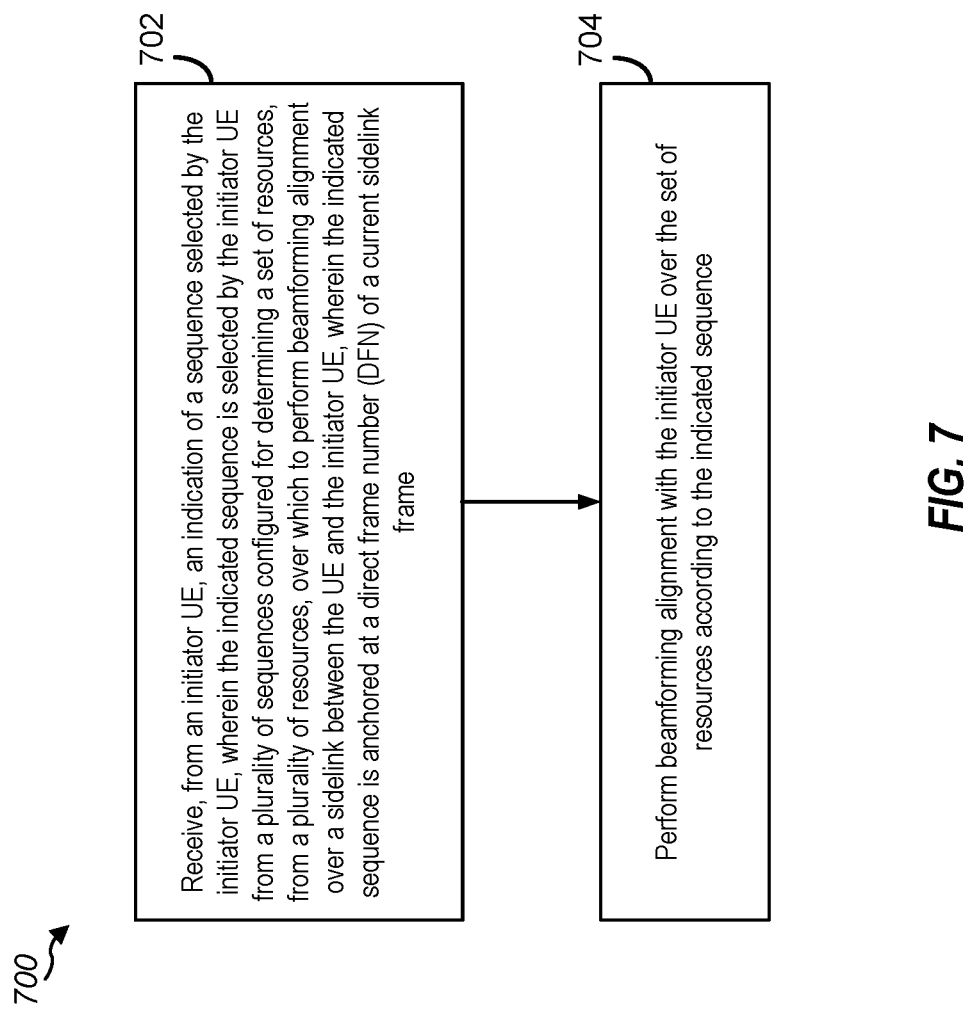
FIG. 7 is a flow diagram illustrating another example process that supports sidelink beamforming alignment over a set of resources based on a deterministic sequence according to one or more aspects.

FIG. 7 is a flow diagram illustrating an example process 700 that provides sidelink beamforming alignment over a set of resources based on a deterministic sequence in a wireless communication system according to one or more aspects. Operations of process 700 may be performed by a UE, such as responder UE 115*b* described above with reference to FIGS. 1-5 and 8. For example, example operations (also referred to as "blocks") of process 700 may enable UE 115 (e.g., UE 115 of FIG. 8) to support mechanisms for sidelink beamforming alignment over a set of resources based on a deterministic sequence.

At block 702 of process 700, a UE (e.g., UE and/or responder UE 115*b*) receives, from an initiator UE, an indication of a sequence selected by the initiator UE. In order to implement the functionality for such operations, UE 115, under control of controller/processor 280, may receive the indication of the sequence selected by the responder UE via wireless radios 801*a-r* and antennas 252*a-r*. In aspects, the indicated sequence may be selected by the initiator UE from a plurality of sequences configured for determining a set of resources, from a plurality of resources, over which to perform beamforming alignment over a sidelink between the UE and the initiator UE, and the indicated sequence may be anchored at a DFN of a current sidelink frame. In aspects, UE 115 may perform operations to receive the indication of the sequence selected by the responder according to operations and functionality as described above with reference to responder UE 115*b* and as illustrated in FIG. 3.

At block 704 of process 700, UE 115 performs beamforming alignment with the initiator UE over the set of resources according to the indicated sequence. In order to implement the functionality for such operations, UE 115, under control of controller/processor 280, executes beamforming logic 803, stored in memory 282. The functionality implemented through the execution environment of beamforming logic 803 allows for UE 115 to perform beamforming alignment operations with the initiator UE according to the various aspects herein. In aspects, UE 115 may perform beamforming alignment operations according to operations and functionality as described above with reference to responder UE 115*b* and as illustrated in FIG. 3.

In one or more aspects, techniques for supporting mechanisms for sidelink COT sharing request signaling in a wireless communication system according to one or more aspects may include additional aspects, such as any single aspect or any combination of aspects described below or in connection with one or more other processes or devices described elsewhere herein. In a first aspect, supporting mechanisms for sidelink COT sharing request signaling in a wireless communication system may include an apparatus configured to select a sequence from a plurality of sequences configured for determining a set of resources, from a plurality of resources, over which to perform beamforming alignment over a sidelink with a responder UE. In this aspect, the selected sequence is anchored at a DFN of a current sidelink frame. The apparatus is further configured to indicate the selected sequence to the responder UE and to perform beamforming alignment with the responder UE over the set of resources according to the selected sequence. Additionally, the apparatus may perform or operate according to one or more aspects as described below. In some implementations, the apparatus includes a wireless device, such as a UE (e.g., an initiator UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the sequence is specified by a sequence index, an index based on a function of a sidelink UE identification, and/or a combination thereof.

In a third aspect, alone or in combination with one or more of the first aspect or the second aspect, the sequence specifies the set of resources based on a periodicity.

In a fourth aspect, alone or in combination with the third aspect, each resource of the set of resources occurs during one period based on the periodicity.

In a fifth aspect, alone or in combination with one or more of the first aspect through the fourth aspect, the techniques of the first aspect include performing, prior to accessing a resource of the set of resources, a re-evaluation of the resource of the set of resources to evaluate whether of the resource is available for access.

In a sixth aspect, alone or in combination with the fifth aspect, the techniques of the first aspect include accessing the resource for beamforming alignment based on a determination that the resource is available for access.

In a seventh aspect, alone or in combination with one or more of the fifth aspect through the sixth aspect, the techniques of the first aspect include foregoing accessing the resource for beamforming alignment based on a determination that the resource is unavailable for access.

In an eighth aspect, alone or in combination with one or more of the first aspect through the seventh aspect, accessing the resource for beamforming alignment based on a determination that the resource is available for access includes preempting a current owner of the resource having a sidelink channel access priority to the resource lower than a channel access priority to the resource of the UE.

In a ninth aspect, alone or in combination with the eighth aspect, foregoing accessing the resource for beamforming alignment based on a determination that the resource is unavailable for access includes foregoing accessing the resource for beamforming alignment based on a determination that the current owner of the resource has a sidelink channel access priority to the resource equal to or higher than the channel access priority to the resource of the UE.

In a tenth aspect, alone or in combination with one or more of the first aspect through the ninth aspect, the sequence is defined based on a hashing function taking as input one or more of a slot index or one or more sidelink UE identifications.

In an eleventh aspect, alone or in combination with the tenth aspect, the hashing function is applied every T slots over U resources in order to define the sequence, wherein T is a periodicity of the sequence and U is a number of resources.

In a twelfth aspect, alone or in combination with one or more of the first aspect through the eleventh aspect, T and U are determined based on a pre-configuration of the UE, a configuration broadcasted to the UE, and/or a function of a CBR measured over the plurality of resources.

In a thirteenth aspect, alone or in combination with one or more of the first aspect through the twelfth aspect, each sequence of the plurality of sequences is associated with a different priority for sidelink channel access.

In a fourteenth aspect, alone or in combination with the thirteenth aspect, selecting the sequence from the plurality of sequences configured for determining the set of resources includes selecting the sequence based on a priority of the traffic flow triggering the beamforming alignment over the sidelink.

In a fifteenth aspect, alone or in combination with one or more of the first aspect through the fourteenth aspect, performing beamforming alignment with the responder UE over the set of resources according to the selected sequence includes transmitting a PSSCH transmission over each resource of the set of resources according to the selected sequence.

In a sixteenth aspect, alone or in combination with the fifteenth aspect, each PSSCH transmission includes one or more of an identification of the UE or an identification of the responder UE.

In a seventeenth aspect, alone or in combination with one or more of the fifteenth aspect through the sixteenth aspect, the responder UE performs a reception beam sweeping on valid PSSCH matching the one or more of the identification of the UE or the identification of the responder UE.

In an eighteenth aspect, alone or in combination with one or more of the first aspect through the seventeenth aspect, each resource in the set of resource includes an anchor resource and one or more resources anchored to the anchor resource.

In a nineteenth aspect, alone or in combination with the eighteenth aspect, a number of the one or more resources is based on a capability of the responder UE to perform multi-hypothesis reception beam sweeping.

In a twentieth aspect, alone or in combination with one or more of the first aspect through the nineteenth aspect, performing beamforming alignment with the responder UE over the set of resources according to the selected sequence includes transmitting over one available resource of the anchor resource and the one or more resources.

In a twenty-first aspect, alone or in combination with the twentieth aspect, the available resource is determined to not be preempted by another UE based on a re-evaluation procedure and is not blocked by an LBT procedure.

In a twenty-second aspect, alone or in combination with one or more of the first aspect through the twenty-first aspect, performing beamforming alignment with the responder UE over the set of resources according to the selected sequence includes transmitting, to the responder UE, over a current resource of the set of resources according to a current index in the sequence, including transmitting a reservation of a next resource according to the sequence.

In a twenty-third aspect, alone or in combination with one or more of the first aspect through the twenty-second aspect, transmitting the reservation includes transmitting the reservation of the next resource according to the sequence based on a determination that the next resource according to the sequence is available for sidelink channel accessing.

In a twenty-fourth aspect, alone or in combination with one or more of the first aspect through the twenty-third aspect, transmitting the reservation includes including an indication to the responder UE that the reservation is a cross-beam reservation, wherein the UE is to switch to another beam for accessing the next resource according to the sequence.

In a twenty-fifth aspect, alone or in combination with one or more of the first aspect through the twenty-fourth aspect, transmitting the reservation includes including an indication to the responder UE of a beam to be used for accessing the next resource according to the sequence.

In a twenty-sixth aspect, alone or in combination with one or more of the first aspect through the twenty-fifth aspect, the beamforming alignment includes beamforming recovery based on a beam failure detection.

In a twenty-seventh aspect, techniques for supporting mechanisms for sidelink COT sharing request signaling in a wireless communication system may include an apparatus configured to receive, from an initiator UE, an indication of a sequence selected by the initiator UE. In the twenty-seventh aspect, the indicated sequence is selected by the initiator UE from a plurality of sequences configured for determining a set of resources, from a plurality of resources, over which to perform beamforming alignment over a sidelink between the UE and the initiator UE, and the indicated sequence is anchored at a DFN of a current sidelink frame. The apparatus is further configured to perform beamforming alignment with the initiator UE over the set of resources according to the indicated sequence. Additionally, the apparatus may perform or operate according to one or more aspects as described below. In some implementations, the apparatus includes a wireless device, such as a UE (e.g., a responder UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-eighth aspect, alone or in combination with one or more of the twenty-seventh aspect through the twenty-seventh aspect, the sequence is specified by a sequence index, an index based on a function of a sidelink UE identification, and/or a combination thereof.

In a twenty-ninth aspect, alone or in combination with one or more of the twenty-seventh aspect through the twenty-eighth aspect, the indicated sequence specifies the set of resources based on a periodicity.

In a thirtieth aspect, alone or in combination with the twenty-ninth aspect, each resource of the set of resources occurs during one period based on the periodicity.

In a thirty-first aspect, alone or in combination with one or more of the twenty-seventh aspect through the thirtieth aspect, the indicated sequence is defined based on a hashing function taking as input one or more of a slot index or one or more sidelink UE identifications.

In a thirty-second aspect, alone or in combination with the thirty-first aspect, the hashing function is applied every T slots over U resources in order to define the sequence, wherein T is a periodicity of the sequence and U is a number of resources.

In a thirty-third aspect, alone or in combination with one or more of the thirty-first aspect through the thirty-second aspect, T and U are determined based on a pre-configuration of the UE, a configuration broadcasted to the UE, and/or a function of a CBR measured over the plurality of resources.

In a thirty-fourth aspect, alone or in combination with one or more of the twenty-seventh aspect through the thirty-third aspect, each sequence of the plurality of sequences is associated with a different priority for sidelink channel access.

In a thirty-fifth aspect, alone or in combination with the thirty-fourth aspect, the indicated sequence is selected by the initiator UE based on a priority of the traffic flow triggering the beamforming alignment over the sidelink.

In a thirty-sixth aspect, alone or in combination with one or more of the twenty-seventh aspect through the thirty-fifth aspect, performing beamforming alignment with the initiator UE over the set of resources according to the selected sequence includes receiving a PSSCH transmission over each resource of the set of resources according to the selected sequence.

In a thirty-seventh aspect, alone or in combination with the thirty-sixth aspect, each PSSCH transmission includes one or more of an identification of the UE or an identification of the initiator UE.

In a thirty-eighth aspect, alone or in combination with one or more of the thirty-sixth aspect through the thirty-seventh aspect, performing beamforming alignment with the initiator UE over the set of resources according to the selected sequence includes performing a reception beam sweeping on valid PSSCH matching the one or more of the identification of the UE or the identification of the initiator UE.

In a thirty-ninth aspect, alone or in combination with one or more of the twenty-seventh aspect through the thirty-eighth aspect, each resource in the set of resource includes an anchor resource and one or more resources anchored to the anchor resource.

In a fortieth aspect, alone or in combination with the thirty-ninth aspect, a number of the one or more resources is based on a capability of the UE to perform multi-hypothesis reception beam sweeping.

In a forty-first aspect, alone or in combination with one or more of the twenty-seventh aspect through the fortieth aspect, performing beamforming alignment with the initiator UE over the set of resources according to the selected sequence includes receiving over one available resource of the anchor resource and the one or more resources.

In a forty-second aspect, alone or in combination with the forty-first aspect, the available resource is preempted by another UE and is not blocked by an LBT procedure.

In a forty-third aspect, alone or in combination with one or more of the twenty-seventh aspect through the forty-second aspect, performing beamforming alignment with the initiator UE over the set of resources according to the selected sequence includes receiving, from the initiator UE, over a current resource of the set of resources according to a current index in the sequence, including receiving a reservation of a next resource according to the sequence.

In a forty-fourth aspect, alone or in combination with one or more of the twenty-seventh aspect through the forty-third aspect, receiving the reservation includes receiving the reservation of the next resource according to the sequence based on a determination that the next resource according to the sequence is available for sidelink channel accessing.

In a forty-fifth aspect, alone or in combination with one or more of the twenty-seventh aspect through the forty-fourth aspect, receiving the reservation includes receiving an indication that the reservation is a cross-beam reservation indicating that the initiator UE is to switch to another beam for accessing the next resource according to the sequence.

In a forty-sixth aspect, alone or in combination with one or more of the twenty-seventh aspect through the forty-fifth aspect, receiving the reservation includes receiving an indication of a beam to be used by the initiator UE for accessing the next resource according to the sequence.

In a forty-seventh aspect, alone or in combination with one or more of the twenty-seventh aspect through the forty-sixth aspect, the beamforming alignment includes beamforming recovery based on a beam failure detection.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   indicating, to a responder UE, a sequence from a plurality of sequences configured for determining a set of resources, from a plurality of resources, over which to perform beamforming alignment over a sidelink with the responder UE, wherein the sequence is anchored at a direct frame number (DFN) of a sidelink frame; and
   performing beamforming alignment with the responder UE over the set of resources according to the sequence.

2. The method of claim 1, wherein the sequence corresponds to a deterministic sequence, and wherein performing the beamforming alignment over the set of resources according to the sequence includes performing a beam sweeping operation over the set of resources in an order specified by the sequence.

3. The method of claim 1, wherein the sequence identifies a periodicity, and wherein the set of resources is allocated in accordance with the periodicity.

4. The method of claim 1, further comprising selecting the sequence, wherein selecting the sequence further comprises:
   applying a first function to a slot index, a sidelink UE identification (ID) of the UE, a sidelink UE ID of the responder UE, or a combination thereof; and
   outputting, in accordance with applying the first function, a resource to be included in the sequence.

5. The method of claim 1, wherein indicating the sequence to the responder UE includes transmitting a sequence indication to the responder UE, wherein the sequence indication includes a first indication of the sequence and a second indication of a priority associated with the sequence, and wherein the priority indicates a sidelink channel access priority.

6. An apparatus for wireless communication, the apparatus comprising:
   a processing system that includes one or more processors and one or more memories coupled with the one or more processors, the processing system configured to:
   indicate, to a responder user equipment (UE), a sequence from a plurality of sequences configured for determining a set of resources, from a plurality of resources, over which to perform beamforming alignment over a sidelink with the responder UE, wherein the sequence is anchored at a direct frame number (DFN) of a sidelink frame; and
   perform beamforming alignment with the responder UE over the set of resources according to the sequence.

7. The apparatus of claim 6, wherein the sequence corresponds to a deterministic sequence, and wherein, to perform the beamforming alignment over the set of resources according to the sequence, the processing system is configured to perform a beam sweeping operation over the set of resources in an order specified by the sequence.

8. The apparatus of claim 6, wherein the sequence identifies a periodicity, and wherein the set of resources is allocated in accordance with the periodicity.

9. The apparatus of claim 6, wherein the processing system is further configured to select the sequence, and wherein, to select the sequence, the processing system is configured to:
   apply a first function to a slot index, a sidelink UE identification (ID) of the UE, a sidelink UE ID of the responder UE, or a combination thereof; and output, in accordance with applying the first function, a resource to be included in the sequence.

10. The apparatus of claim 9, wherein the first function includes a hashing function, and wherein the hashing function is invoked periodically to generate the sequence until the sequence specifies a threshold number of resources in the set of resources.

11. The apparatus of claim 10, wherein, to specify the sequence, the processing system is configured to apply a second function to the resource, wherein the second function includes a modulo function, and wherein an argument of the modulo function includes a parameter indicating a number of resources over which the sequence is to be distributed.

12. The apparatus of claim 9, wherein, to apply the first function, the processing system is configured to apply the first function in accordance with a first parameter that indicates a periodicity with which the first function is to be applied and in accordance with a second parameter that indicates a quantity of resources over which an output of the first function is to be distributed.

13. The apparatus of claim 12, wherein the processing system is further configured to select the first parameter and the second parameter over a channel busy ratio (CBR) measured over the plurality of resources.

14. The apparatus of claim 6, wherein the processing system is further configured to select the sequence, and wherein, to select the sequence, the processing system is configured to select the sequence according to a priority of traffic flow, wherein the traffic flow triggered the beamforming alignment.

15. The apparatus of claim 6, wherein, to indicate the sequence to the responder UE, the processing system is configured to transmit a sequence indication to the responder UE, wherein the sequence indication includes a first indication of the sequence and a second indication of a priority associated with the sequence, and wherein the priority indicates a sidelink channel access priority.

16. An apparatus for wireless communication, the apparatus comprising:
a processing system that includes one or more processors and one or more memories coupled with the one or more processors, the processing system configured to:
receive, from an initiator user equipment (UE), an indication of a sequence selected by the initiator UE, the sequence indicating a set of resources, from a plurality of resources, over which to perform beamforming alignment over a sidelink with the initiator UE; and
perform beamforming alignment with the initiator UE over the set of resources in accordance with the sequence.

17. The apparatus of claim 16, wherein the processing system is further configured to:
transmit, to the initiator UE, a feedback message, wherein the feedback message indicates, to the initiator UE, that the indication of the sequence was correctly received.

18. The apparatus of claim 17, wherein the feedback message includes an acknowledgement/negative acknowledgement (ACK/NACK).

19. The apparatus of claim 16, wherein the processing system is further configured to:
receive beam alignment transmissions over subchannels in accordance with the sequence.

20. The apparatus of claim 19, wherein the beam alignment transmissions carry a first sidelink UE identification (ID) of the initiator UE, and wherein the processing system is further configured to:
perform reception beam sweeping on a valid beam alignment transmission of beam alignment transmissions, wherein the valid beam alignment transmission includes a beam alignment transmission over which the first sidelink UE ID of the initiator UE matches a second sidelink UE ID of the UE.

* * * * *